US012391093B2

(12) United States Patent
Hagström et al.

(10) Patent No.: US 12,391,093 B2
(45) Date of Patent: Aug. 19, 2025

(54) METHOD FOR PRECONDITIONING VEHICLES

(71) Applicant: Ningbo Geely Automobile Research & Development Co., Ltd., Ningbo (CN)

(72) Inventors: Albin Hagström, Lödöse (SE); Jonathan Johansson, Gothenburg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 421 days.

(21) Appl. No.: 17/555,388

(22) Filed: Dec. 18, 2021

(65) Prior Publication Data

US 2022/0111702 A1  Apr. 14, 2022

Related U.S. Application Data

(63) Continuation of application No. PCT/CN2020/101309, filed on Jul. 10, 2020.

(30) Foreign Application Priority Data

Aug. 8, 2019 (EP) .................................. 19190823

(51) Int. Cl.
*B60H 1/00* (2006.01)
*F02N 19/02* (2010.01)
*G06Q 10/20* (2023.01)

(52) U.S. Cl.
CPC ......... *B60H 1/00778* (2013.01); *F02N 19/02* (2013.01); *G06Q 10/20* (2013.01)

(58) Field of Classification Search
CPC ...... B60H 1/00778; F02N 19/02; G06Q 10/20
See application file for complete search history.

(56) References Cited

U.S. PATENT DOCUMENTS

| 6,357,244 B1 | 3/2002 | Mori | |
| 2002/0019760 A1* | 2/2002 | Murakami | G06Q 10/08 705/7.25 |
| 2004/0069482 A1* | 4/2004 | Yoshinori | B60H 1/247 165/266 |
| 2010/0023210 A1 | 1/2010 | Flick | |
| 2010/0192602 A1* | 8/2010 | Brooks | F25B 17/083 62/235.1 |

(Continued)

FOREIGN PATENT DOCUMENTS

| CN | 102166939 A | 8/2011 | |
| CN | 104153918 A * | 11/2014 | ........... F02M 31/125 |

(Continued)

OTHER PUBLICATIONS

International Search Report from corresponding International Application No. PCT/CN2020/101309, mailed on Oct. 10, 2020, 2 pages.

*Primary Examiner* — Aryan E Weisenfeld
(74) *Attorney, Agent, or Firm* — Tucker Ellis LLP

(57) ABSTRACT

A method for preconditioning vehicles of a vehicle fleet, wherein vehicles of the vehicle fleet are provided at a vehicle fleet parking area when not used. The method includes the step of preconditioning a number of the vehicles of the vehicle fleet parked at the vehicle fleet parking area before such a vehicle is to be used, and the step of selecting the number of vehicles to be preconditioned based on historical data with respect to demand for using vehicles of the vehicle fleet.

20 Claims, 1 Drawing Sheet

(56) References Cited

U.S. PATENT DOCUMENTS

| | | | |
|---|---|---|---|
| 2011/0063132 A1* | 3/2011 | Trum | G01C 21/3682 |
| | | | 340/932.2 |
| 2011/0184773 A1* | 7/2011 | Forstall | G06Q 10/06315 |
| | | | 705/7.25 |
| 2015/0343882 A1* | 12/2015 | Satzger | B60H 1/00007 |
| | | | 165/202 |
| 2016/0225262 A1* | 8/2016 | Edakunni | G06Q 10/04 |
| 2017/0018181 A1* | 1/2017 | Davidsson | H04L 67/12 |
| 2019/0011931 A1 | 1/2019 | Selvam et al. | |
| 2019/0043355 A1* | 2/2019 | Ferguson | G06Q 30/0205 |
| 2019/0136816 A1* | 5/2019 | Awad | F02N 11/0811 |
| 2019/0179336 A1* | 6/2019 | Colijn | G06Q 10/00 |
| 2019/0220036 A1* | 7/2019 | Weslosky | G07C 5/008 |
| 2019/0263290 A1* | 8/2019 | Monahan | B60L 58/16 |
| 2020/0156435 A1* | 5/2020 | Patil | B60H 1/00742 |
| 2020/0242944 A1* | 7/2020 | Barberis | G08G 1/202 |
| 2020/0312058 A1* | 10/2020 | Clément | G01S 17/86 |
| 2020/0410861 A1* | 12/2020 | Nellros | G08G 1/143 |

FOREIGN PATENT DOCUMENTS

| | | | | |
|---|---|---|---|---|
| CN | 104298236 A * | 1/2015 | | B60W 30/10 |
| CN | 107074065 A | 8/2017 | | |
| CN | 108062855 A | 5/2018 | | |
| CN | 108859810 A | 11/2018 | | |
| CN | 109074621 A | 12/2018 | | |
| CN | 109968943 A | 7/2019 | | |
| CN | 113767405 A * | 12/2021 | | G06Q 10/0631 |
| DE | 102014001554 A1 | 8/2015 | | |
| DE | 102014224108 A1 | 6/2016 | | |
| DE | 102017222288 A1 | 6/2019 | | |
| JP | 2007129302 A * | 5/2007 | | |
| WO | WO-2016029598 A1 * | 3/2016 | | F02M 31/125 |
| WO | WO-2019238389 A1 * | 12/2019 | | B60H 1/00778 |

\* cited by examiner

METHOD FOR PRECONDITIONING VEHICLES

This application is a continuation of International Patent Application No. PCT/CN2020/101309, filed Jul. 10, 2020, which claims the benefit of European Patent Application No. 19190823.5, filed Aug. 8, 2019, the disclosures of which are incorporated herein by reference in their entireties.

TECHNICAL FIELD

The invention relates to a method for preconditioning vehicles of a vehicle fleet and a control unit for controlling preconditioning of vehicles of a vehicle fleet.

BACKGROUND

When using vehicle fleets, the users of the vehicles may have comfort demands on the vehicles. For example, customers using vehicles of a vehicle fleet for car sharing, often prefer to enter a vehicle that is preconditioned. In case of cold weather, the vehicles can be heated and in case of hot weather, the vehicles can be cooled, before the customer picks up the vehicle. An optimization of the vehicle temperature in accordance with the customer requests will however require a relatively high energy consumption which involves costs and environmental impact.

SUMMARY

An objective of the invention is to provide a method for preconditioning vehicles of a vehicle fleet, where preconditioned vehicles can be provided at the same time as the energy consumption can be reduced.

The objective is achieved by a method for preconditioning vehicles of a vehicle fleet, wherein vehicles of the vehicle fleet are provided at a vehicle fleet parking area when not used, and the method comprises the step of preconditioning a number of the vehicles of the vehicle fleet parked at the vehicle fleet parking area before such a vehicle is to be used, and the step of selecting the number of vehicles to be preconditioned based on historical data with respect to demand for using vehicles of the vehicle fleet.

The invention is based on the insight that by such a method, preconditioned vehicles can be provided without always preconditioning all vehicles of the vehicle fleet. By the use of historical data with respect to demand for using vehicles of the vehicle fleet, the number of preconditioned vehicles can be adapted to the frequency of use and thereby unnecessary heating/cooling of vehicles can be avoided.

Thus, a customer does not need to order a vehicle in advance for receiving a preconditioned vehicle, since a preconditioned vehicle can be provided immediately when ordered.

The historical data may include collected data indicating demand for vehicles as a function of time of day, weekday, time of year, weather conditions, particular events, and other parameters that can be used for estimating the near future demand for vehicles of the vehicle fleet. Non-complicated as well as more advanced algorithms giving different number of vehicles to be preconditioned for different time periods with various resolution can be used. The system can be continuously updated by information about the number of vehicles that has been used at a certain point of time together with additional information about current parameters having an impact on the frequency of use at the time point.

According to one embodiment of the method, the method comprises the step of preconditioning said number of vehicles by means of a climate control system of each vehicle, for reaching a desired interior climate of the vehicle before the vehicle is to be used. For example, by heating or cooling a passenger compartment of the vehicle by means of the climate control system, a desired temperature can be achieved.

According to a further embodiment, the method comprises the step of preconditioning said number of vehicles by means of an engine heater of each vehicle, for reaching a desired engine temperature of the vehicle before the vehicle is to be used. Hereby, vehicles to be used can be driven more environmentally friendly with lower fuel consumption.

According to a further embodiment, the method comprises the step of preconditioning a further vehicle of the vehicle fleet parked at the vehicle fleet parking area for each preconditioned vehicle leaving the vehicle fleet parking area, for maintaining the number of preconditioned vehicles. Hereby, the number of preconditioned vehicles can be kept constant during a period of time when demand is constant.

According to a further embodiment, the method comprises the step of selecting the number of vehicles to be preconditioned as a function of the current time of the day. Hereby, a non-complicated algorithm can be used taking a variation of demand during the day into consideration. For example, during the time when most people will go to or leave the work, an increased number of vehicles can be preconditioned, whereas during nights a decreased number of vehicles can be preconditioned, as compared to the average number of preconditioned vehicles required.

According to a further embodiment, the method comprises the step of selecting the number of vehicles to be preconditioned as a function of the current geographical position of the vehicle fleet parking area. Hereby, the number of vehicles to be preconditioned can be adapted to local demand. When different places for the vehicle fleet parking area are used, the demand may vary due to the population, whether or not the parking area is centrally located, etc.

The number of vehicles to be preconditioned is dependent on the estimated demand as described hereinabove. However, often more than 0 and less than the total number of vehicles of the vehicle fleet parked at the vehicle fleet parking area are preconditioned.

The vehicles to be preconditioned can of course also be dependent on the number of vehicles being parked at the vehicle fleet parking area, and according to a further embodiment the method comprises the step of selecting the number of vehicles to be preconditioned as a subset of the total number of vehicles of the vehicle fleet parked at the vehicle fleet parking area, wherein the subset of vehicles to be preconditioned is more than 5% and less than 95% of the total number of vehicles of the vehicle fleet parked at the vehicle fleet parking area. Further, in case of electric vehicles, to be one of the number of vehicles to be preconditioned, a charge level of the vehicle battery above a predetermined threshold value may be required.

According to another aspect of the invention, a further objective is to provide a control unit for controlling preconditioning of vehicles of a vehicle fleet, by which control unit preconditioned vehicles can be provided at the same time as the energy consumption can be reduced.

This objective is achieved by a control unit for controlling preconditioning of vehicles of a vehicle fleet, wherein vehicles of the vehicle fleet are provided at a vehicle fleet parking area when not used, and wherein the control unit is configured to receive historical data with respect to demand for using vehicles of the vehicle fleet, select a number of vehicles to be preconditioned based on the received historical data, and control a climate control system and/or an engine heater of each vehicle of said number of vehicles for preconditioning the vehicle before the vehicle is to be used.

The advantages of the control unit are similar to the advantages already discussed hereinabove with reference to the different embodiments of the method.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
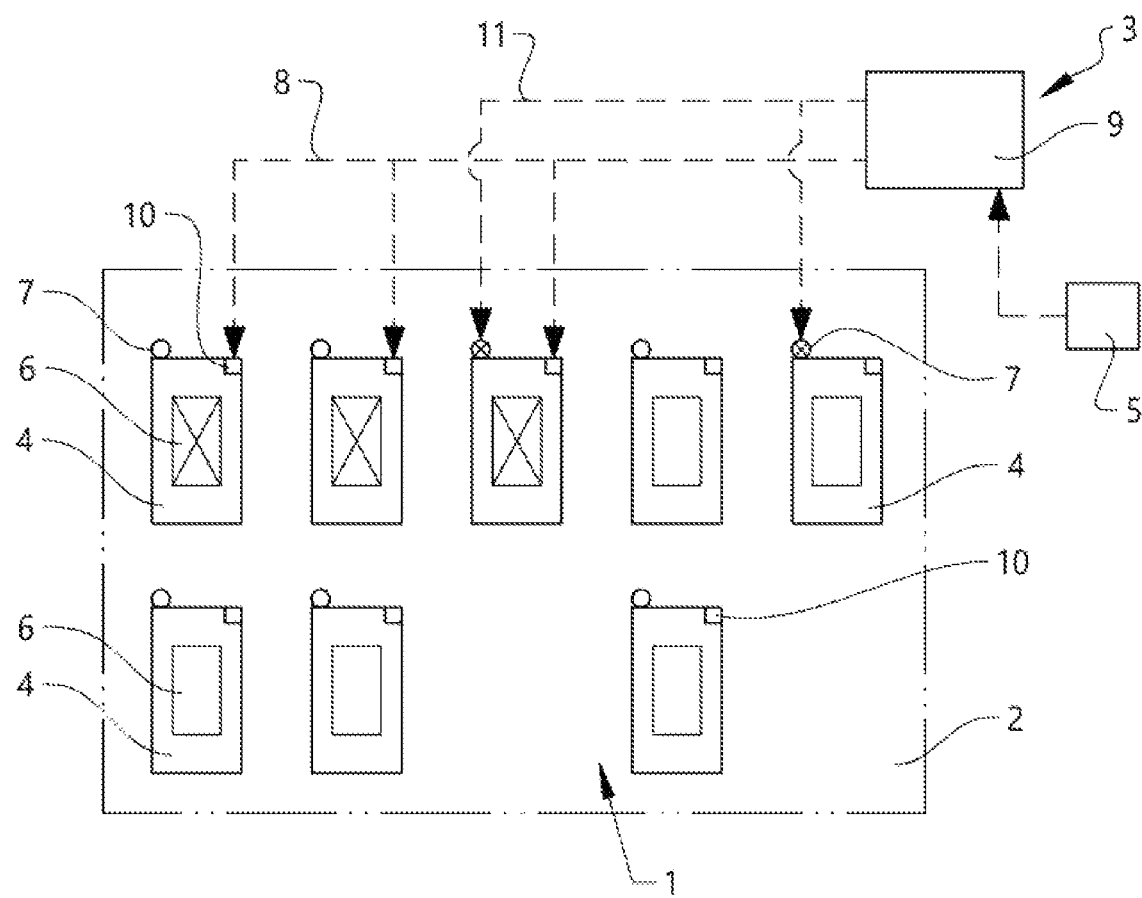
FIG. 1 shows a vehicle fleet at a vehicle fleet parking area and a control unit for controlling preconditioning of vehicles of the vehicle fleet.

FIG. 1 shows a vehicle fleet 1 at a vehicle fleet parking area 2. Such a vehicle fleet can be used for providing a vehicle sharing system. FIG. 1 further shows a control unit 3 for controlling preconditioning of vehicles 4 of the vehicle fleet 1. The control unit 3 is arranged for controlling preconditioning of vehicles 4 of the vehicle fleet 1 at the vehicle fleet parking area 2. For this purpose, the control unit 3 is configured to receive historical data 5 with respect to demand for using vehicles 4 of the vehicle fleet 1, select a number of vehicles parked at the vehicle fleet parking area 2 to be preconditioned based on the received historical data 5, and configured to control a climate control system 6 and/or an engine heater 7 of each vehicle of said number of vehicles for preconditioning the vehicle before the vehicle is to be used.

The control unit 3 can be configured to control the climate control system 6 of the vehicle for heating or cooling a passenger compartment of the vehicle when preconditioning the vehicle and/or to control the engine heater 7 of the vehicle for heating the engine when preconditioning the vehicle.

Each vehicle 4 of the vehicle fleet 1 has suitably such a climate control system 6. The control unit 3 can transmit control signals 8 to the climate control systems 6, preferably by wireless communication. Alternatively, communication is performed by wire or cable. For example, a charging cable used for charging a battery of the vehicle can also transmit the control signals 8 to a computer unit of the vehicle and further to the climate control system.

Such a climate control system 6 may comprise several components for providing a requested air quality and/or temperature in a passenger compartment of the vehicle.

Furthermore, the climate control system may also comprise a defroster function for defogging/defrosting windows of the vehicle by heating the windows.

The climate control systems 6 are schematically indicated by squares in FIG. 1. The components of the climate control system, which can be a HVAC system, are not described herein, since the climate control system and the components thereof are known by the person skilled in the art. Further, the climate control systems which are activated for preconditioning the vehicles are schematically indicated by crosses in the current squares. Thus, as an example only, in FIG. 1 three of eight vehicles of the vehicle fleet 1 have the climate control system activated for preconditioning the vehicle.

The control unit 3 can comprise a central control unit 9 and one or more sub control units 10. Each vehicle 4 of the vehicle fleet 1 is suitably provided with such a sub control unit 10 arranged on the vehicle. The central control unit 9 can be used for activating and deactivating the climate control systems 6 and/or the engine heaters 7, and for transmitting information to respective vehicle how the vehicle should be preconditioned. The control of the climate control system 6 when activated by the central control unit 9, can thereafter be performed by the central control unit 9 or preferably by means of the sub control unit 10 arranged on the vehicle. This sub control unit 10 is suitably the same control unit as used during use of the vehicle, i.e. when driving outside the vehicle fleet parking area 2, for controlling the climate control system 6 of the vehicle 4.

Alternatively to or in combination with the climate control system 6, each vehicle has suitably an engine heater 7 as mentioned above. In a similar way, the central control unit 9 can transmit control signals 11 to the engine heaters 7, preferably by wireless communication. Alternatively, communication is performed by wire or cable. For example, a charging cable used for charging a battery of the vehicle can also transmit the control signals 11 to a computer unit of the vehicle and further to the engine heater.

The engine heaters 7 are schematically indicated by small circles in FIG. 1. The components of the engine heaters are not described herein, since a lot of engine heaters are known by the person skilled in the art. Further, the engine heaters 7 which are activated for preconditioning the vehicle 4 are schematically indicated by crosses in the current circles. Thus, as an example only, in FIG. 1 two of eight vehicles of the vehicle fleet 1 have the engine heater activated for preconditioning the vehicle.

Figure 2:
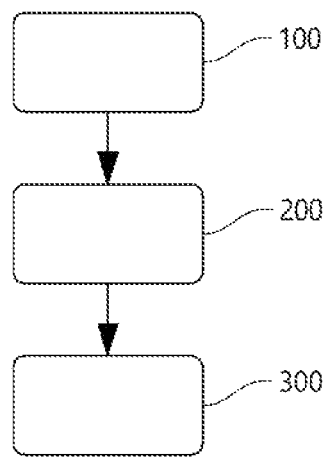
FIG. 2 is a flow chart illustrating a method for preconditioning vehicles of the vehicle fleet.

FIG. 2 shows a flow chart illustrating one example embodiment of a method for preconditioning vehicles of a vehicle fleet. As regards the components used for performing the method, reference is also made to the description hereinabove and FIG. 1.

The vehicles 4 of the vehicle fleet 1 are provided at a vehicle fleet parking area 2 when not used, and the method comprises the step of preconditioning a number of the vehicles of the vehicle fleet parked at the vehicle fleet parking area before such a vehicle is to be used, and the step of selecting the number of vehicles to be preconditioned based on historical data 5 with respect to demand for using vehicles 4 of the vehicle fleet 1.

The method comprises the step of receiving 100 historical data 5 with respect to demand for using vehicles 4 of the vehicle fleet 1. Such historical data 5 can be achieved by continuously collecting and processing data related to the frequency of use of the vehicles of the vehicle fleet. Such historical data 5 is then transferred to the control unit 3 for estimating the future demand for vehicles.

The method further comprises the step of selecting 200 the number of vehicles to be preconditioned based on the historical data 5 received. The number of vehicles to be preconditioned is suitably estimated and selected in order to ensure that there is always a preconditioned vehicle ready when a customer wants a vehicle and the total preconditioned time for the vehicles is minimized by keeping the number of preconditioned vehicles as small as possible.

The method also comprises the step of sending 300 control signals to the vehicles to be preconditioned for controlling the climate control system 6 and/or the engine heater 7 of each such vehicle. Such control signals 8, 11 can be transmitted to the vehicles by the control unit 3 as previously described hereinabove.

The method preferably comprises the step of selecting the number of vehicles to be preconditioned as a function of the current time of the day and/or as a function of the current geographical position of the vehicle fleet parking area.

The method can comprise the step of preconditioning said number of vehicles by means of the climate control system 6 of each vehicle, for reaching a desired interior climate of the vehicle before the vehicle is to be used, particularly for preconditioning said number of vehicles by heating or cooling a passenger compartment of the vehicle by means of the climate control system 6, though other interior climate parameters such as for example air quality also could be controlled for preconditioning the vehicle.

As illustrated in FIG. 1, the method can comprise the step of preconditioning said number of vehicles by means of the engine heater 7 of each vehicle, for reaching a desired engine temperature of the vehicle before the vehicle is to be used. In addition to lower emissions from the vehicles, this may also save energy by reducing the fuel consumption of the vehicles when initially driving the vehicles.

In a further embodiment of the method, the method comprises the step of preconditioning a further vehicle of the vehicle fleet parked at the vehicle fleet parking area for each preconditioned vehicle leaving the vehicle fleet parking area, for maintaining the number of preconditioned vehicles.

The control unit 3 illustrated in FIG. 1 may comprise one or more microprocessors and/or one or more memory devices or any other components for executing computer programs to perform the method. Thus, the control unit 3 is preferably provided with a computer program comprising program code means for performing the steps of any example embodiment of the method described hereinabove.

It is to be understood that the present invention is not limited to the embodiments described above and illustrated in the drawings; rather, the skilled person will recognize that many changes and modifications may be made within the scope of the appended claims.

What is claimed is:

1. A computer-implemented method executed on at least one processor of a control unit for preconditioning vehicles of a vehicle fleet to meet future vehicle demand by automatically controlling one or more systems and/or components associated with the vehicles, vehicles of the vehicle fleet being provided at a vehicle fleet parking area when not being used, the method comprising:
    selecting, via the at least one processor of the control unit, a number of vehicles of the vehicle fleet parked at the vehicle fleet parking area to be preconditioned based on historical data with respect to demand for using vehicles of the vehicle fleet, wherein the selecting comprises selecting the number of vehicles to be preconditioned based on the historical data as a function of a current time of day and a current geographical position of the vehicle fleet parking area;
    issuing, via the at least one processor of the control unit and based on the historical data, one or more control signals for preconditioning the selected number of vehicles of the vehicle fleet parked at the vehicle fleet parking area before such a vehicle is to be used; and
    preconditioning the selected number of vehicles by automatically controlling, via the one or more issued control signals, a climate control system and/or an engine heater of each vehicle of the selected number of vehicles.

2. The method according to claim 1, wherein the preconditioning the selected number of vehicles comprises automatically controlling, via the one or more issued control signals, the climate control system of each vehicle of the selected number of vehicles for reaching a desired interior climate of the vehicle before the vehicle is to be used.

3. The method according to claim 2, wherein the preconditioning the selected number of vehicles comprises heating or cooling a passenger compartment of the vehicle by automatically controlling, via the one or more issued control signals, the climate control system of each vehicle.

4. The method according to claim 1, wherein preconditioning the selected number of vehicles comprises automatically controlling, via the one or more issued control signals, the engine heater of each vehicle of the selected number of vehicles for reaching a desired engine temperature of the vehicle before the vehicle is to be used.

5. The method according to claim 1, further comprising:
    maintaining the number of preconditioned vehicles by preconditioning a further vehicle of the vehicle fleet parked at the vehicle fleet parking area for each preconditioned vehicle leaving the vehicle fleet parking area, wherein the maintaining comprises:
    selecting, via the at least one processor of the control unit, the further vehicle of the vehicle fleet parked at the vehicle fleet parking area to be preconditioned based on historical data with respect to demand for using vehicles of the vehicle fleet, wherein the selecting comprises selecting the further vehicle to be preconditioned based on the historical data as a function of the current time of day and the current geographical position of the vehicle fleet parking area;
    issuing, via the at least one processor of the control unit and based on the historical data, an additional control signal for preconditioning the further vehicle of the vehicle fleet parked at the vehicle fleet parking area before the further vehicle is to be used; and
    preconditioning the further vehicle by automatically controlling, via the additional issued control signal, a climate control system and/or an engine heater of the further vehicle.

6. The method according to claim 1, wherein the selecting comprises selecting the number of vehicles to be preconditioned to be more than 0 and less than a total number of vehicles of the vehicle fleet parked at the vehicle fleet parking area.

7. The method according to claim 1, further comprising:
    using the vehicle fleet for a vehicle sharing system.

8. The method according to claim 1, wherein the selecting comprises selecting the number of vehicles to be preconditioned as a subset of a total number of vehicles of the vehicle fleet parked at the vehicle fleet parking area, wherein the subset of vehicles to be preconditioned is more than 5% and less than 95% of the total number of vehicles of the vehicle fleet parked at the vehicle fleet parking area.

9. A control unit for preconditioning vehicles of a vehicle fleet to meet future vehicle demand by automatically controlling one or more systems and/or components associated with the vehicles, vehicles of the vehicle fleet being provided at a vehicle fleet parking area when not being used, the control unit comprising:
    at least one processor; and a transitory memory device operatively coupled with the at least one processor, the non-transitory memory device storing a program comprising executable instructions that, when executed on the at least one processor of the control unit or loaded onto the at least one processor of the control unit, causes the control unit to automatically control preconditioning of vehicles of the vehicle fleet, wherein the control unit:
receives, at the at least one processor, historical data with respect to demand for using vehicles of the vehicle fleet;
selects, via the at least one processor, a number of vehicles of the vehicle fleet parked at the vehicle fleet parking area to be preconditioned based on the received historical data, the control unit configured to select the number of vehicles to be preconditioned based on the historical data as a function of a current time of day and a current geographical position of the vehicle fleet parking area;
issues, via the at least one processor and based on the historical data, one or more control signals for preconditioning the selected number of vehicles of the vehicle fleet parked at the vehicle fleet parking area before such a vehicle is to be used; and
preconditions the selected number of vehicles by automatically controlling, via the one or more issued control signals, a climate control system and/or an engine heater of each vehicle of the selected number of vehicles.

10. The control unit according to claim 9, wherein the control unit is configured to precondition the selected number of vehicles by automatically controlling, via the one or more issued control signals, the climate control system of each vehicle to reach a desired interior climate of the vehicle by heating or cooling a passenger compartment of the vehicle when preconditioning the vehicle.

11. The control unit according to claim 9, wherein the control unit is configured to precondition the selected number of vehicles by automatically controlling, via the one or more issued control signals, the engine heater of each vehicle to reach a desired engine temperature of the vehicle by heating the vehicle's engine when preconditioning the vehicle.

12. A non-transitory computer readable storage medium storing a computer program comprising program instructions that, when executed on at least one processor of a computer or loaded onto the at least one processor of the computer, causes the computer to perform a method for preconditioning vehicles of a vehicle fleet to meet future vehicle demand by automatically controlling one or more systems and/or components associated with the vehicles, vehicles of the vehicle fleet being provided at a vehicle fleet parking area when not being used, by:
selecting, via the at least one processor, a number of vehicles of the vehicle fleet parked at the vehicle fleet parking area to be preconditioned based on historical data with respect to demand for using vehicles of the vehicle fleet, wherein the selecting comprises selecting the number of vehicles to be preconditioned based on the historical data as a function of a current time of day and a current geographical position of the vehicle fleet parking area;
issuing, via the at least one processor and based on the historical data, one or more control signals for preconditioning the selected number of vehicles of the vehicle fleet parked at the vehicle fleet parking area before such a vehicle is to be used; and
preconditioning the selected number of vehicles by automatically controlling, via the one or more issued control signals, a climate control system and/or an engine heater of each vehicle of the selected number of vehicles.

13. The control unit according to claim 9, wherein the control unit is further configured to select the number of vehicles to be preconditioned based on the historical data as a function of a charge level of a vehicle battery exceeding a predetermined threshold value for each electric vehicle of the selected number of vehicles.

14. The control unit according to claim 9, wherein the control unit is further configured to:
maintain the number of preconditioned vehicles by preconditioning a further vehicle of the vehicle fleet parked at the vehicle fleet parking area for each preconditioned vehicle leaving the vehicle fleet parking area,
wherein the control unit maintains the number of preconditioned vehicles by being further configured to:
receive, at the at least one processor, historical data with respect to demand for using vehicles of the vehicle fleet;
select, via the at least one processor, the further vehicle of the vehicle fleet parked at the vehicle fleet parking area to be preconditioned based on the received historical data, the control unit configured to select the further vehicle to be preconditioned based on the historical data as a function of the current time of day and the current geographical position of the vehicle fleet parking area;
issue, via the at least one processor and based on the historical data, an additional control signal for preconditioning the further vehicle of the vehicle fleet parked at the vehicle fleet parking area before the further vehicle is to be used; and
precondition the further vehicle by automatically controlling, via the additional issued control signal, a climate control system and/or an engine heater of the further vehicle.

15. The control unit according to claim 9, wherein the control unit is further configured to precondition the selected number of vehicles by automatically controlling, via the one or more issued control signals, the climate control system of each vehicle to provide a requested air quality in a passenger compartment of the vehicle when preconditioning the vehicle.

16. The control unit according to claim 9, wherein the control unit is further configured to select the number of vehicles to be preconditioned as a subset of a total number of vehicles of the vehicle fleet parked at the vehicle fleet parking area, wherein the subset of vehicles to be preconditioned is more than 5% and less than 95% of the total number of vehicles of the vehicle fleet parked at the vehicle fleet parking area.

17. The control unit according to claim 9, wherein the control unit is further configured to select the number of vehicles to be preconditioned based on the historical data as a function of weather conditions.

18. The method according to claim 1, wherein the selecting further comprises selecting the number of vehicles to be preconditioned based on the historical data as a function of a charge level of a vehicle battery exceeding a predetermined threshold value for each electric vehicle of the selected number of vehicles.

19. The method according to claim 1, wherein the selecting further comprises selecting the number of vehicles to be preconditioned based on the historical data as a function of weather conditions.

20. The method according to claim 1, wherein the preconditioning the selected number of vehicles comprises automatically controlling, via the one or more issued control signals, the climate control system of each vehicle of the selected number of vehicles for providing a requested air quality in a passenger compartment of the vehicle before the vehicle is to be used.

* * * * *